United States Patent
Lin et al.

(10) Patent No.: US 9,036,005 B2
(45) Date of Patent: May 19, 2015

(54) MEASURING APPARATUS FOR MEASURING STEREO VIDEO FORMAT AND ASSOCIATED METHOD

(75) Inventors: Wen-Chi Lin, Yunlin County (TW); Ching-Sheng Cheng, Nantou County (TW); Yueh-Hsuan Tsai, Hsinchu County (TW); Guo-Zhan Zhuang, Kaohsiung County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 562 days.

(21) Appl. No.: 13/430,645

(22) Filed: Mar. 26, 2012

(65) Prior Publication Data

US 2012/0249733 A1     Oct. 4, 2012

(30) Foreign Application Priority Data

Mar. 31, 2011    (TW) .............................. 100111372 A

(51) Int. Cl.
| | | |
|---|---|---|
| H04N 15/00 | (2006.01) | |
| H04N 13/04 | (2006.01) | |
| H04N 13/00 | (2006.01) | |
| H04N 9/80 | (2006.01) | |
| H04N 5/92 | (2006.01) | |
| H04N 5/84 | (2006.01) | |
| H04N 5/89 | (2006.01) | |
| H04N 19/597 | (2014.01) | |

(52) U.S. Cl.
CPC ....... H04N 13/0048 (2013.01); H04N 13/0059 (2013.01); *H04N 2213/007* (2013.01); *H04N 19/597* (2014.11)

(58) Field of Classification Search
USPC .................. 386/239, 326, 335; 348/42, 43, 51
See application file for complete search history.

(56) References Cited

U.S. PATENT DOCUMENTS

| | | | |
|---|---|---|---|
| 2011/0032333 | A1 | 2/2011 | Neuman |
| 2011/0074921 | A1* | 3/2011 | Takiduka et al. ............... 348/43 |

FOREIGN PATENT DOCUMENTS

| | | |
|---|---|---|
| CN | 101308573 A | 11/2008 |
| CN | 101668221 A | 3/2010 |
| CN | 102036044 A | 4/2011 |
| TW | 200847128 | 12/2008 |
| TW | 201103310 | 1/2011 |

\* cited by examiner

*Primary Examiner* — Daquan Zhao
(74) *Attorney, Agent, or Firm* — Winston Hsu; Scott Margo

(57) ABSTRACT

A measuring apparatus for measuring a stereo video format includes an active space measuring circuit and a decision circuit. The active space measuring circuit is utilized for determining a position of an active space of a frame packing to generate an active space measuring result according to pixels values of a plurality of scan lines of the frame packing. The decision circuit is coupled to the active space measuring circuit, and is utilized for determining the stereo video format according to at least the active space measuring result.

16 Claims, 4 Drawing Sheets

MEASURING APPARATUS FOR MEASURING STEREO VIDEO FORMAT AND ASSOCIATED METHOD

BACKGROUND OF THE INVENTION

1. Field of the Invention

The present invention relates to an image processing apparatus, and more particularly, to a measuring apparatus for measuring a stereo video format and associated method.

2. Description of the Prior Art

Due to popularization of stereo video, many stereo video formats are published. When a display begins to display the stereo video, a stereo video format, such as lengths of an active video and active space, should be determined so as to make the stereo video be correctly displayed. Therefore, the display requires a method which can measure the stereo video format efficiently and accurately to make a user enjoy the high quality stereo video.

SUMMARY OF THE INVENTION

It is therefore an objective of the present invention to provide an apparatus for measuring a stereo video format and associated method, to determine the stereo video format more accurately.

According to one embodiment of the present invention, a measuring apparatus for measuring a stereo video format includes an active space measuring circuit and a decision circuit. The active space measuring circuit is utilized for determining a position of an active space of a frame packing to generate an active space measuring result according to pixels values of a plurality of scan lines of the frame packing. The decision circuit is coupled to the active space measuring circuit, and is utilized for determining the stereo video format according to at least the active space measuring result.

According to another embodiment of the present invention, a measuring method for measuring a stereo video format comprises: determining a position of an active space of a frame packing to generate an active space measuring result according to pixels values of a plurality of scan lines of the frame packing; and determining the stereo video format according to at least the active space measuring result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
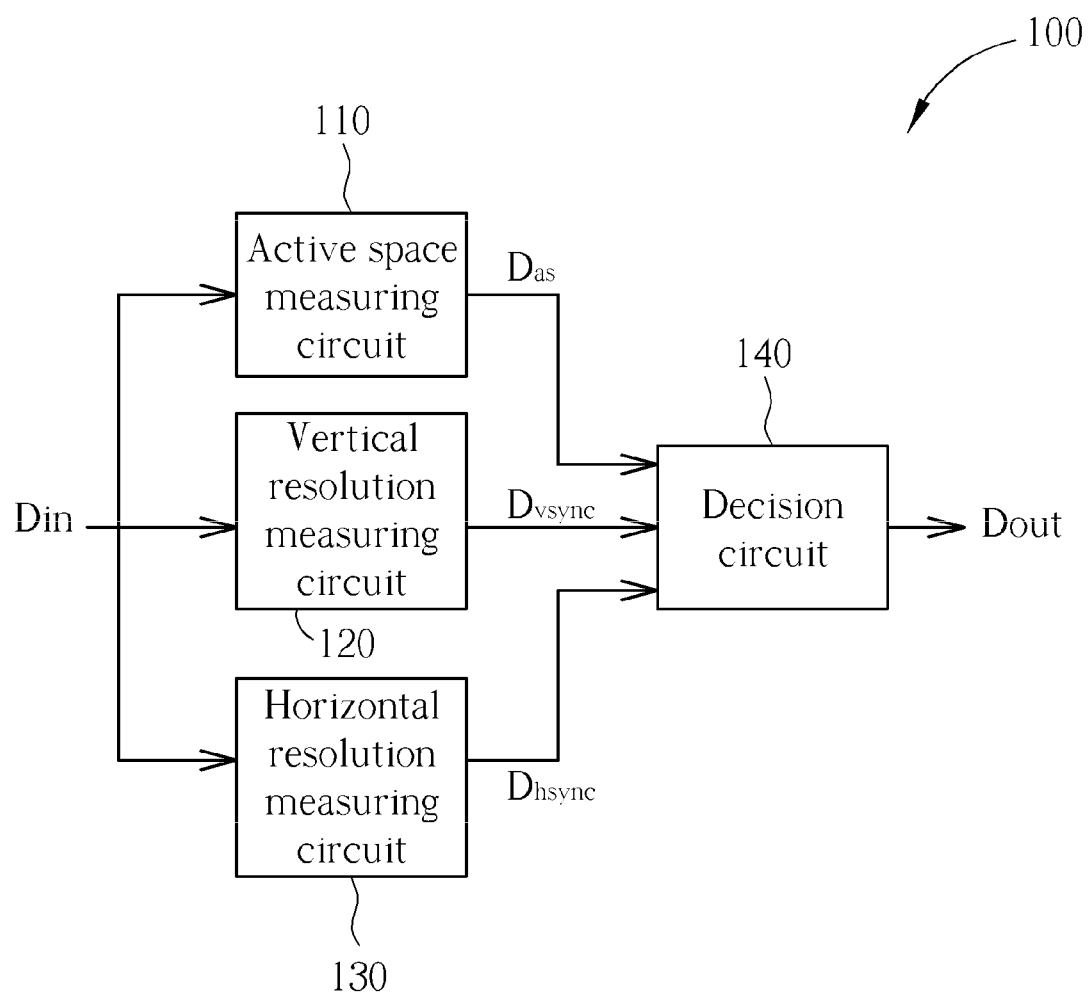
FIG. 1 is a diagram illustrating a measuring apparatus for measuring stereo video format according to one embodiment of the present invention.
Figure 2:
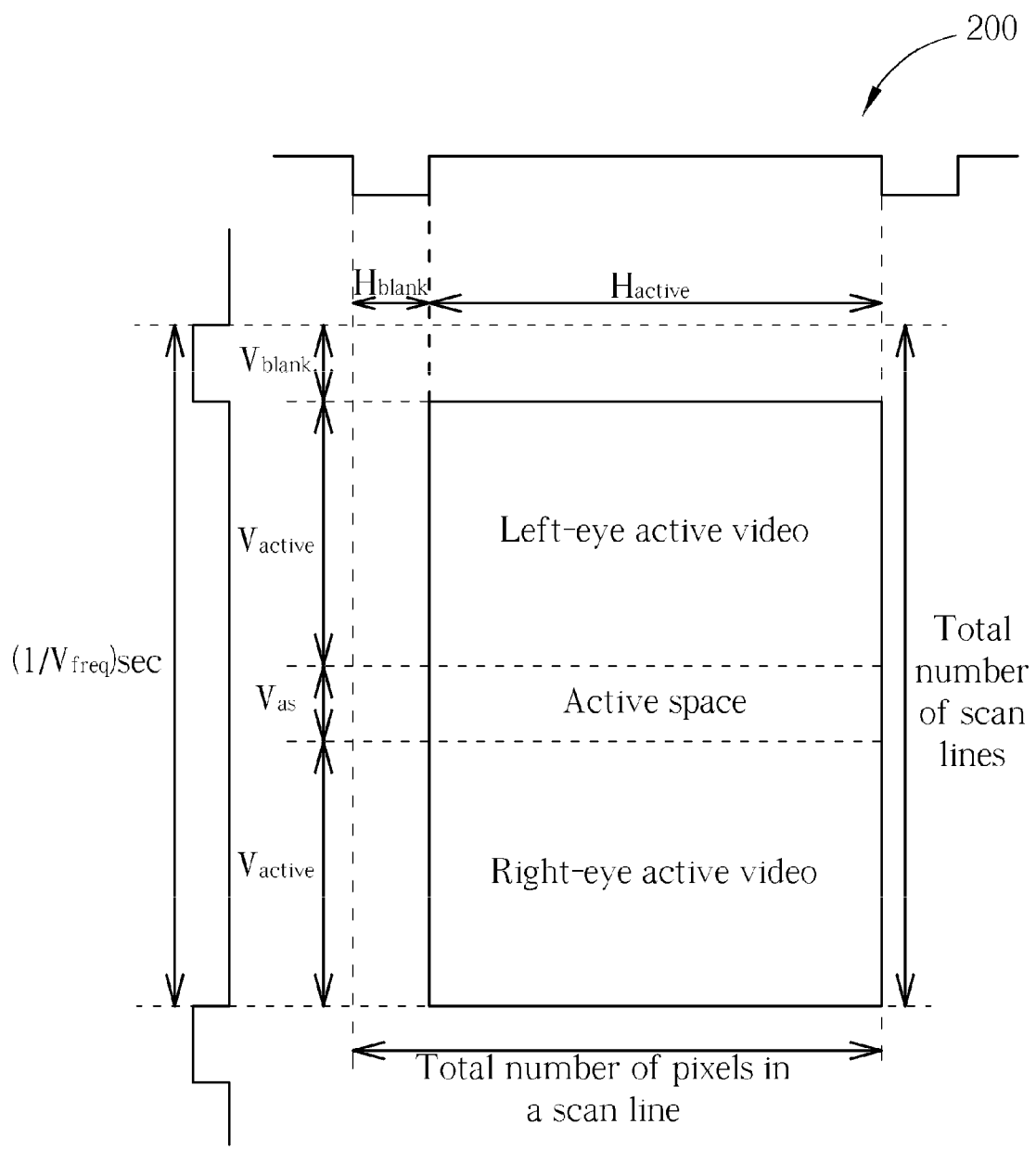
FIG. 2 is a diagram showing a stereo video format.

FIG. 1 is a diagram illustrating a measuring apparatus 100 for measuring stereo video format according to one embodiment of the present invention. The measuring apparatus 100 includes an active space measuring circuit 110, a vertical resolution measuring circuit 120, a horizontal resolution measuring circuit 130 and a decision circuit 140. The measuring apparatus 100 is built in a display, and is used to determine a stereo video format of stereo video data Din to generate a decision result Dout, where the stereo video data Din can be from a video disc or any other video source. In this embodiment, the stereo video data Din is complied with a high definition multimedia interface (HDMI) specification, and the data format is shown in FIG. 2. As shown in FIG. 2, a frame packing 200 includes a left-eye active video and a right-eye active video, and an active space is between the left-eye active video and the right-eye active video, where each pixel value in the active space is a predetermined value (i.e., all the pixel values in the active space are the same). In addition, FIG. 2 further shows a horizontal blanking interval length Hblank, a horizontal width of the effective video Hactive, a vertical blanking interval length Vblank, a vertical length of the effective video Vactive, a length of the active space Vas and a display time ((1/Vfreq)) of the frame packing 200, where Vfreq is an operating frequency. In addition, further information about the data format show in FIG. 2 can be seen in HDMI version 1.4 specification.

In the operations of the measuring apparatus 100, the active space measuring circuit 110 measures pixel values of a plurality of scan lines in the frame packing 200, and determines a position of the active space in the frame packing 200 to generate an active space measuring result Das according to these pixel values. The following disclosure describes several embodiments of the operations of the active space measuring circuit 110.

Figure 3:
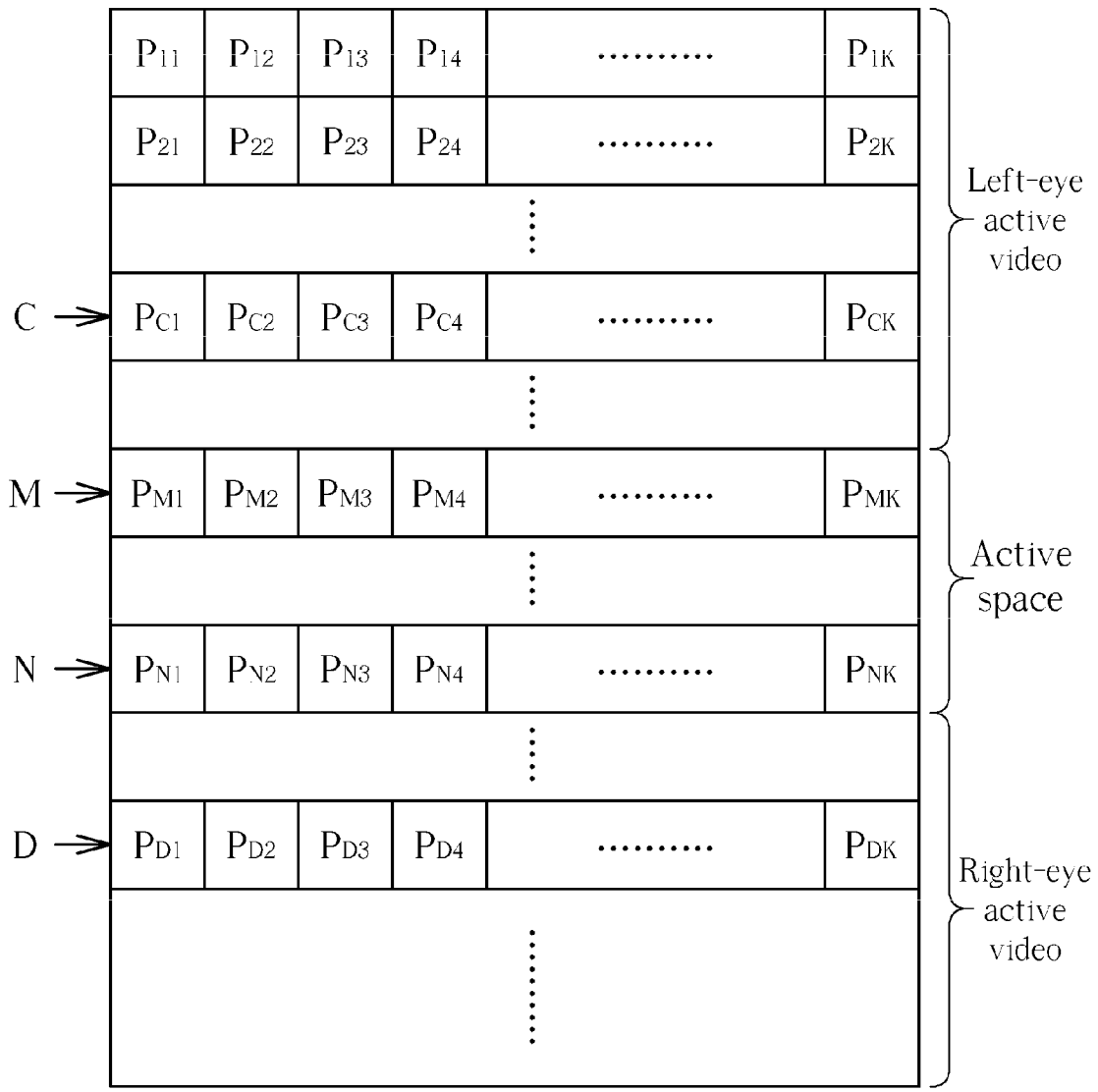
FIG. 3 is a diagram illustrating how to determine an active space of a frame packing.

In a first embodiment, because each pixel value in the active space should be a predetermined value, therefore, for each scan line, the active space measuring circuit 110 compares a plurality of pixel values in the scan lines with the predetermined value, respectively, to generate a plurality of comparing results, and determines whether the scan line is in the active space or not to generate a decision result according to the comparing results. Then, the active space measuring circuit 110 determines the position of the active space in the frame packing 200 to generate the active space measuring result Das according to the decision results of the scan lines. Taking FIG. 3 as an example, for a first scan line, the active space measuring circuit 110 compares pixel values of the pixels $P_{11}$, $P_{12}$, $P_{13}$, ... $P_{1k}$ with the predetermined value, respectively, to generate a plurality of comparing results, where the plurality of comparing results respectively correspond to the pixels $P_{11}$, $P_{12}$, $P_{13}$, ... $P_{1k}$. Then, the active space measuring circuit 110 performs statistics or calculations upon the comparing results; if a number of pixel values, not equal to the predetermined value, is not greater than a threshold, it is meant that a great portion of pixel values in the first scan line are equal to the predetermined value, the active space measuring circuit 110 determines that the first scan line is in the active space of the frame packing 200. If the number of pixel values, not equal to the predetermined value, is greater than the threshold, the active space measuring circuit 110 determines that the first scan line is not in the active space. In light of above, by determining whether the scan lines are in the active space individually, the active space measuring circuit 110 can determine that the active space is between the $M^{th}$ scan line and the $N^{th}$ scan line.

In a second embodiment, for a plurality of pixel values on each scan line, the active space measuring circuit 110 compares each pixel value with another pixel value to generate a plurality of comparing results, respectively, and determines whether the scan line is in the active space. Then, the active space measuring circuit 110 determines the position of the active space in the frame packing 200 to generate the active space measuring result Das according to the determined results of the scan lines. Taking FIG. 3 as an example, for the first scan line, the active space measuring circuit 110 compares the pixel values between the pixels $P_{11}$ and $P_{12}$, compares the pixel values between the pixels $P_{12}$ and $P_{13}$, compares the pixel values between the pixels $P_{13}$ and $P_{14}$, . . . etc., to generate a plurality of comparing results. The active space measuring circuit 110 further calculates a counting value which shows a number of comparing results that indicate that their compared two pixel values are different. When the counting value is not greater than a threshold (or the counting value is very small), it is meant that a great portion of pixels of the first scan line have the same pixel value, the active space measuring circuit 110 therefore determines that the first scan line is in the active space of the frame packing 200. When the counting value is greater than the threshold, the active space measuring circuit 110 determines that the first scan line is not in the active space of the frame packing 200. In light of above, the active space measuring circuit 110 can determine that the active space is between the $M^{th}$ scan line and the $N^{th}$ scan line.

In a third embodiment, the active space measuring circuit 110 merely measures a portion of scan lines in the frame packing 200 (not measures all the scan lines in the frame packing 200) to generate the active space measuring result Das. For example, the active space measuring circuit 110 can preliminarily determine that the active space maybe between the $C^{th}$ scan line and the $D^{th}$ scan line according to the information of the stereo video data Din. Therefore, the active space measuring circuit 110 can measure only the $C^{th}$ scan line and the $D^{th}$ scan line of the frame packing 200 to generate the active space measuring result Das. Because the detailed measuring method can refer to the above-mentioned first embodiment and the second embodiment, further descriptions are omitted here.

In a fourth embodiment, one of the above-mentioned three embodiments is used by the active space measuring circuit 110 to measure each of a plurality of frame packings. Then, the active space measuring circuit 110 determines the position of the active space of the frame packings according to the measuring results of the plurality of frame packings (e.g., only when a scan line is determined to be in the active space in each of the frame packings can the scan line be finally determined in the active space).

Then, the vertical resolution measuring circuit 120 and the horizontal resolution measuring circuit 130 use the counting method to measure information of a vertical direction and a horizontal direction of the frame packing 200. For example, the vertical resolution measuring circuit 120 can measure a total number of scan lines (e.g., by counting a well-known signal Hsync), a vertical blanking interval length Vblank (e.g., by using a clock to count the vertical blanking interval), a vertical length of the effective video Vactive (e.g., by using a clock to count the effective video Vactive), a time length of an enabling period of a vertical synchronous signal and a polarity of the vertical synchronous signal, to generate a vertical resolution measuring result. The horizontal resolution measuring circuit 130 can measure a total number of pixels in a scan line, a horizontal blanking interval length Hblank, a horizontal length of the effective video Vactive, a time length of an enabling period of a horizontal synchronous signal and a polarity of the horizontal synchronous signal, to generate a horizontal resolution measuring result.

Finally, the decision circuit 140 determines the stereo video format of the stereo video data Din according to the active space measuring result Das. That is, the decision circuit 140 selects one of the known stereo video formats to be the stereo video format of the stereo video data Din according to the active space measuring result Das. Furthermore, the decision circuit 140 determines if the determined stereo video format of the stereo video data Din is different from that of previous displayed stereo video data. If the stereo video format of the stereo video data Din is different from that of previous displayed stereo video data, the decision circuit 140 transmits a decision result Dout to a back-end circuit to notify that the stereo video format is changed, and the operation of the back-end circuit may be changed due to the change of the stereo video format. Of course, the decision circuit 140 can determine the stereo video format of the stereo video data Din more accurately by referring to the active space measuring result Das, the vertical resolution measuring result and the horizontal resolution measuring result.

It is noted that the stereo video format shown in FIG. 2 is for illustrative purposes only, and should not be a limitation of the present invention. In other embodiments of the present invention, the stereo video data Din can have any other stereo video format, and each frame packing can have more than two effective video and can have more than one active space.

Figure 4:
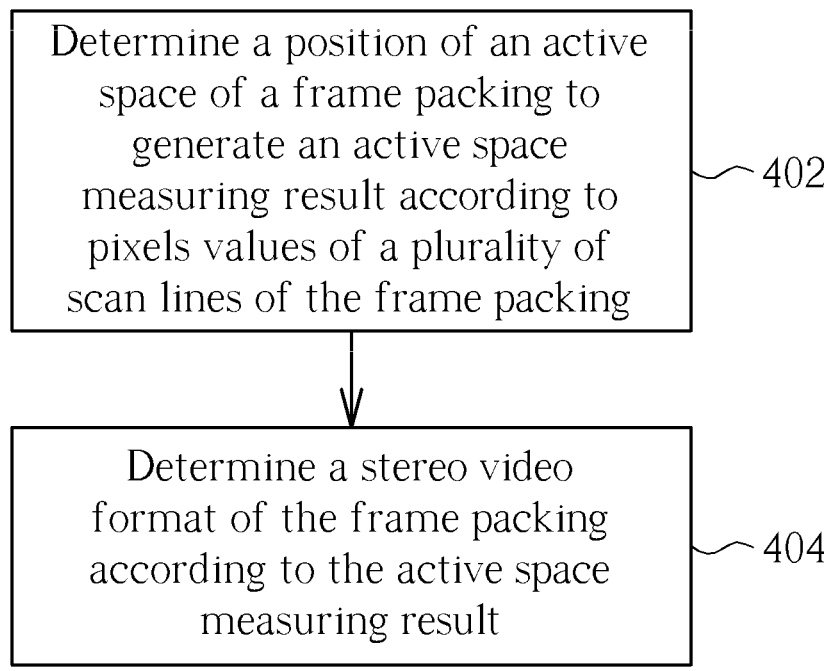
FIG. 4 is a flowchart of a measuring method for measuring stereo video format according to one embodiment of the present invention.

Please refer to FIG. 4. FIG. 4 is a flowchart of a measuring method for measuring a stereo video format according to one embodiment of the present invention. Referring to FIG. 4, the flow is described as follows.

Step 402: determine a position of an active space of a frame packing to generate an active space measuring result according to pixels values of a plurality of scan lines of the frame packing.

Step 404: determine a stereo video format of the frame packing according to the active space measuring result.

Briefly summarized, the measuring apparatus and method for measuring the stereo video format of the present invention can determine if the stereo video format is changed in a real-time matter so as to make the stereo images viewed by the user appear to be of a higher viewing quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A measuring apparatus for measuring a stereo video format, comprising:
   an active space measuring circuit, for determining a position of an active space of a frame packing to generate an active space measuring result according to pixels values of a plurality of scan lines of the frame packing; and
   a decision circuit, coupled to the active space measuring circuit, for determining the stereo video format according to at least the active space measuring result.

2. The apparatus of claim 1, wherein the active space measuring circuit compares the pixels values of the plurality of scan lines with a predetermined value, respectively, to generate a plurality of comparing results, and generates a plurality of determination results of the scan lines according to the plurality of comparing results; and the active space measuring circuit further determines the position of the active space to generate the active space measuring result according to the plurality of determination results of the scan lines.

3. The apparatus of claim 2, wherein the plurality of comparing results represent that whether the pixel values are equal to the predetermined value, respectively.

4. The apparatus of claim 1, wherein for pixel values on each of the scan lines, the active space measuring circuit compares each pixel value with another pixel value to generate a plurality of comparing results, respectively, and generates a plurality of determination results of the scan lines according to the plurality of comparing results; and the active space measuring circuit further determines the position of the active space to generate the active space measuring result according to the plurality of determination results of the scan lines.

5. The apparatus of claim 4, wherein each of the plurality of comparing results represents that whether the compared two pixel values are the same.

6. The apparatus of claim 1, wherein the active space measuring circuit determines the position of the active space of the frame packing to generate the active space measuring result by measuring pixels values of scan lines of a plurality of frame packings.

7. The apparatus of claim 1, further comprising:
a vertical resolution measuring circuit, for measuring information of a vertical resolution of the frame packing to generate a vertical resolution measuring result;
wherein the decision circuit determines the stereo video format according to at least the active space measuring result and the vertical resolution measuring result.

8. The apparatus of claim 1, further comprising:
a horizontal resolution measuring circuit, for measuring information of a horizontal resolution of the frame packing to generate a horizontal resolution measuring result;
wherein the decision circuit determines the stereo video format according to at least the active space measuring result and the horizontal resolution measuring result.

9. A measuring method for measuring a stereo video format, comprising:
determining a position of an active space of a frame packing to generate an active space measuring result according to pixels values of a plurality of scan lines of the frame packing; and
determining the stereo video format according to at least the active space measuring result.

10. The method of claim 9, wherein the step of generating the active space measuring result comprises:
comparing the pixels values of the plurality of scan lines with a predetermined value, respectively, to generate a plurality of comparing results, and generating a plurality of determination results of the scan lines according to the plurality of comparing results; and
determining the position of the active space to generate the active space measuring result according to the plurality of determination results of the scan lines.

11. The method of claim 10, wherein the plurality of comparing results represent that whether the pixel values are equal to the predetermined value, respectively.

12. The method of claim 9, wherein the step of generating the active space measuring result comprises:
comparing each pixel value with another pixel value to generate a plurality of comparing results, respectively, and generating a plurality of determination results of the scan lines according to the plurality of comparing results; and
determining the position of the active space to generate the active space measuring result according to the plurality of determination results of the scan lines.

13. The method of claim 12, wherein each of the plurality of comparing results represents that whether the compared two pixel values are the same.

14. The method of claim 9, wherein the step of generating the active space measuring result comprises:
determining the position of the active space of the frame packing to generate the active space measuring result by measuring pixels values of scan lines of a plurality of frame packings 15. The method of claim 9, further comprising:
measuring information of a vertical resolution of the frame packing to generate a vertical resolution measuring result; and
determining the stereo video format according to at least the active space measuring result and the vertical resolution measuring result.

16. The method of claim 9, further comprising:
measuring information of a horizontal resolution of the frame packing to generate a horizontal resolution measuring result; and
determining the stereo video format according to at least the active space measuring result and the horizontal resolution measuring result.

* * * * *